Figure 4:
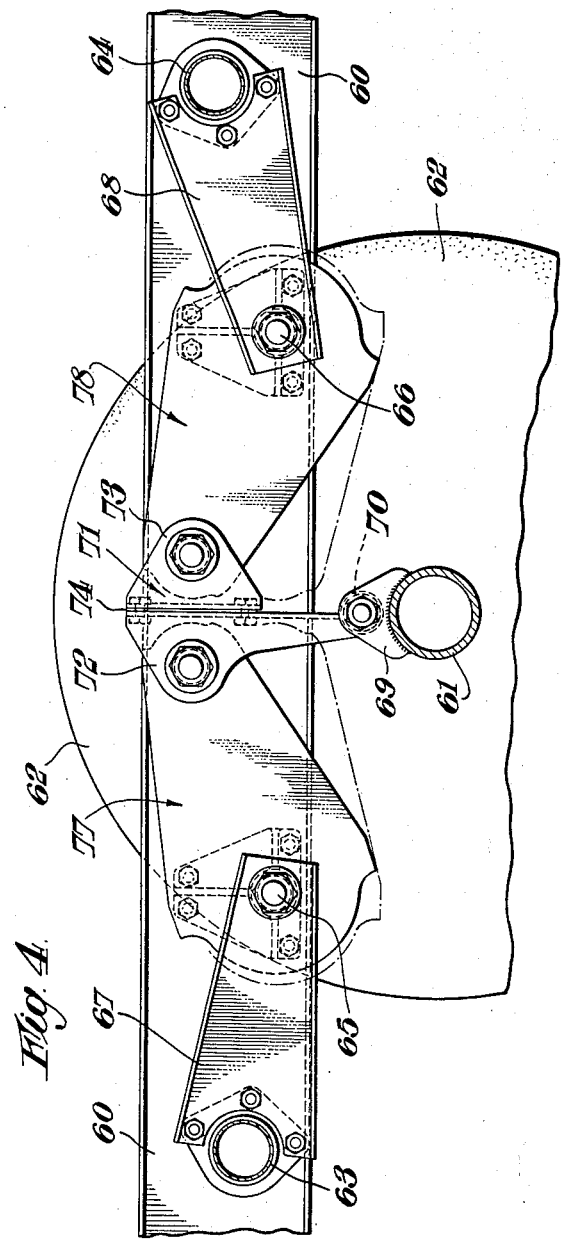

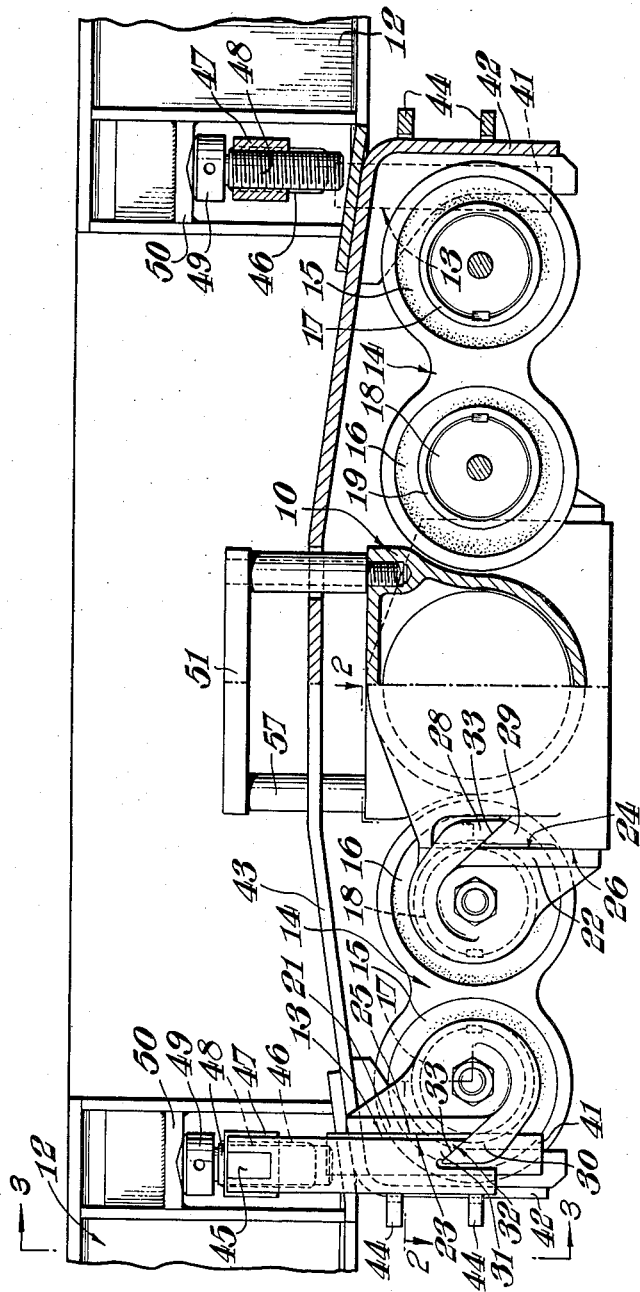

Aug. 27, 1963    A. J. HIRST    3,101,938
VEHICLE SUSPENSIONS
Filed March 11, 1960    7 Sheets-Sheet 2
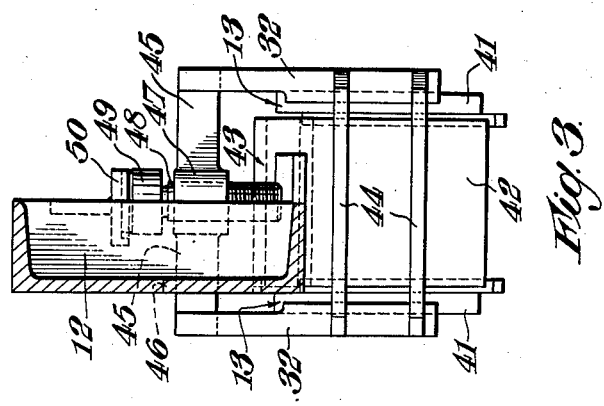
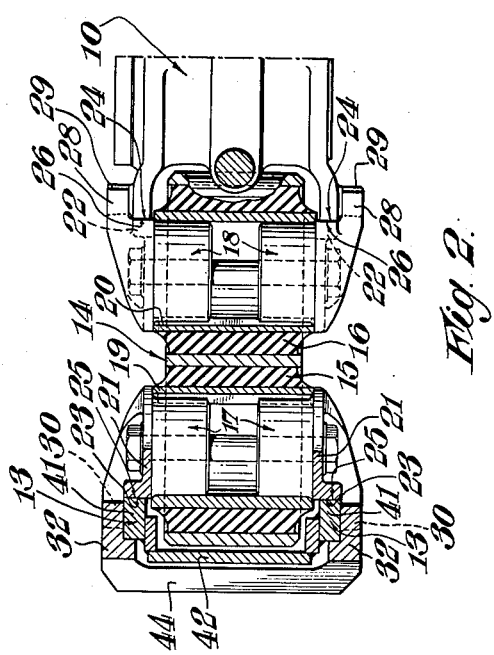

Aug. 27, 1963  A. J. HIRST  3,101,938
VEHICLE SUSPENSIONS
Filed March 11, 1960  7 Sheets-Sheet 3

Inventor
Archie John Hirst
By Kenon, Palmer & Stewart

Aug. 27, 1963  A. J. HIRST  3,101,938
VEHICLE SUSPENSIONS
Filed March 11, 1960  7 Sheets-Sheet 5

Inventor
Archie John Hirst
By Kenyon, Palmer & Stewart

Aug. 27, 1963    A. J. HIRST    3,101,938
VEHICLE SUSPENSIONS
Filed March 11, 1960    7 Sheets-Sheet 6
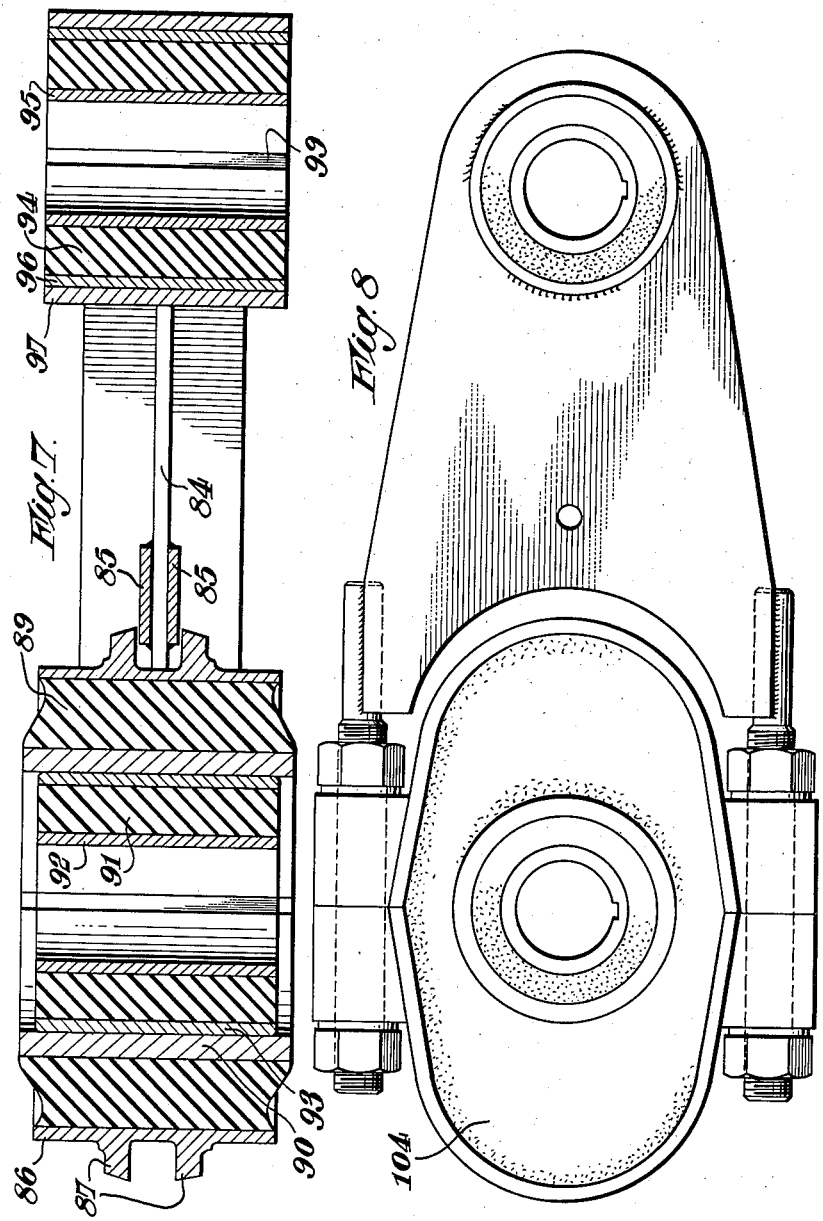
Inventor
Archie John Hirst
By Kemon, Palmer & Stewart United States Patent Office  3,101,938
Patented Aug. 27, 1963

3,101,938
VEHICLE SUSPENSIONS
Archie John Hirst, Leicester, England, assignor to Metalastik Limited, Leicester, England, a British company
Filed Mar. 11, 1960, Ser. No. 14,418
Claims priority, application Great Britain Mar. 17, 1959
6 Claims. (Cl. 267—25)

This invention relates to vehicle suspensions and concerns axle suspensions for road and rail vehicles.

According to the invention a vehicle axle suspension comprises a pair of links extending from opposite sides of the axle casing generally fore and aft of the vehicle, a pivot member at one end of each link connecting the link to the axle casing, a pivot member at the other end of each link connecting the link to a frame member of the vehicle, one at least of said pivot members associated with each link being of rubber, the links being so arranged that at least under tare load on the axle casing the links are in compression.

Preferably the pivot members at both ends of each link are of rubber.

Preferably also the rubber pivot members are rubber bushes which are compressed radially by the compression in the links, but the rubber pivot members may be part-circular or part-spherical rubber interlayers between correspondingly shaped attachment elements.

According to a feature of the present invention, more particularly applicable to railway vehicles, the arrangement of the links may be such that all vertical operational loads on the axle casing are resisted by the rubber pivot members acting in torsion, the links being in compression for all such loads.

With a suspension as just defined the rubber pivot members may constitute the sole springs of the axle suspension. Such a suspension provides that while the torsional stiffness of the rubber pivot members (e.g. the rubber bushes) remains constant, the total vertical stiffness of the suspension is reduced because the bushes are in radial compression due to the compression in the links and by selecting the degree of compression, which may be readily done, the effective stiffness of the bushes may be chosen so as to obtain a given spring rate over the normal range of loads. Furthermore, this may be done using links of relatively short length which is of advantage in an axle box suspension for a railway vehicle.

In one form of the present invention as applied to an axle box suspension, the axle box constituting said axle casing, the axle box is positioned between confronting frame members of the vehicle and the outer ends of the links are connected one to each of said confronting frame members. The confronting frame members take the place of the conventional horn guides, the distance between which is conventionally restricted so that short links are of advantage as stated above since no substantial increase in the horn guide spacing is necessary.

Since the links are in compression for all operational loads (by which is to be understood tare, full and overload) it may be readily arranged that the links are held between the confronting frame members (e.g. the horn guides) and the axle-box without the provision of complex fastening devices, and according to a further feature of the invention the links are held in position between the confronting frame members and the axle box by the forces of compression on the links.

According to an alternative feature of the present invention, more particularly applicable to road vehicles, the rubber pivot members may constitute auxiliary springs of the axle suspension, the suspension further comprising a main spring system supporting the axle casing from a frame member of the vehicle.

In this case, according to a further feature of the present invention, the links may be so arranged that under full load conditions the links are in tension, vertical loads on the axle casing above a predetermined load greater than tare load being resisted by the rubber pivot members acting in torsion and by compression thereof lengthwise of the links.

With this arrangement the total vertical stiffness of the suspension is reduced at tare load and loading below said predetermined load compared with the main spring system acting alone, due to the compression in the links under these conditions, the total vertical stiffness above said predetermined load being, however, increased compared with the main spring system due to the tension in the links under the latter loading conditions.

Figure 5:
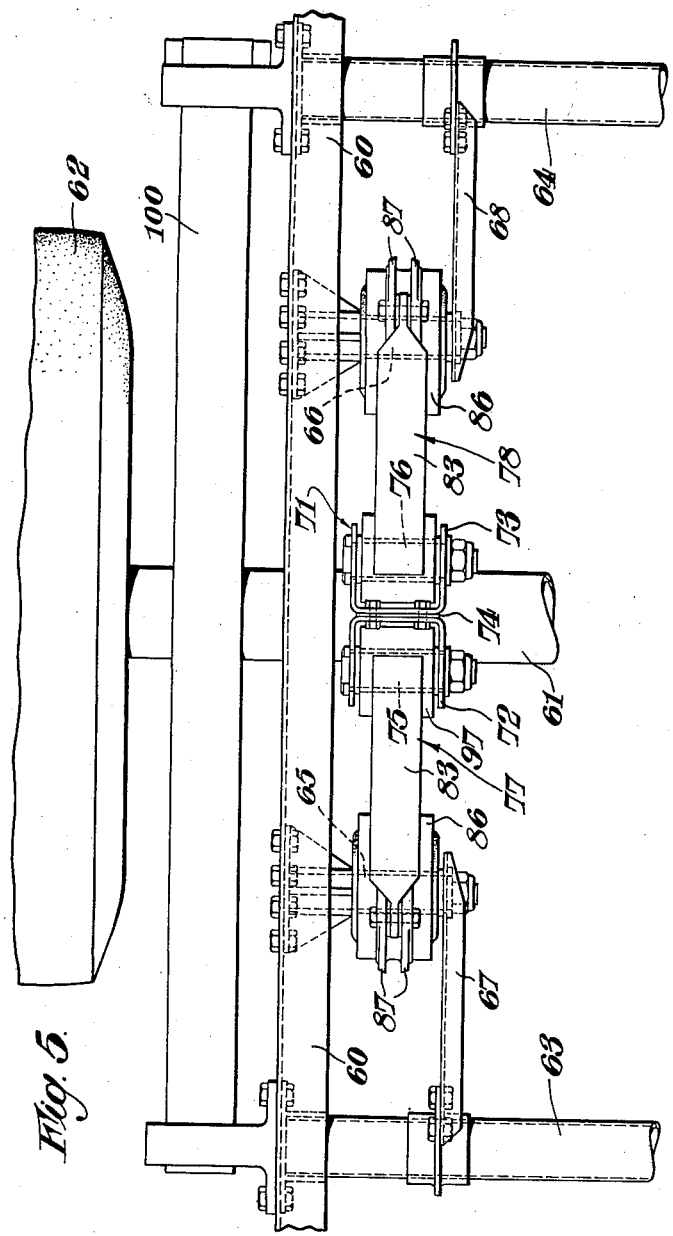
Figure 6:
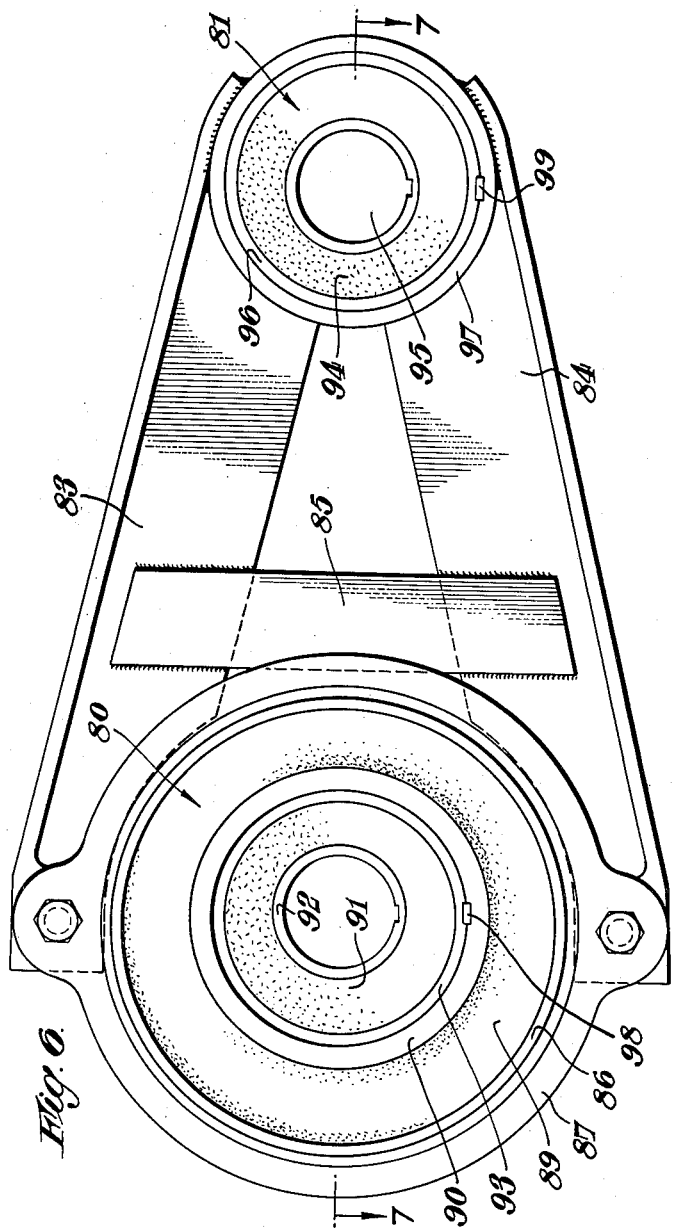
Figure 9:
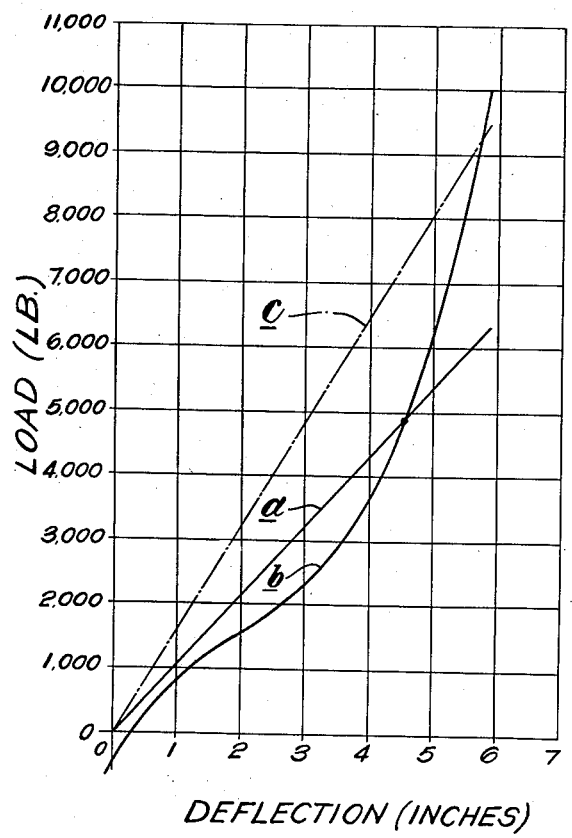

Specific embodiments of the present invention will now be described, merely by way of example, with reference to the accompanying drawings whereof:

FIGURE 1 is an elevation of a railway vehicle axle-box suspension according to the invention part in section to show details of construction, FIGURE 2 is a view on line 2—2 in FIG. 1, FIGURE 3 is a view on line 3—3 in FIG. 1, FIGURE 4 is an elevation of a road vehicle rear axle suspension according to the invention, FIGURE 5 is a plan of the suspension shown in FIG. 4, FIGURE 6 is a detail view of part of the suspension shown in FIGS. 4 and 5, FIGURE 7 is a cross-section on line 7—7 in FIG. 6, FIGURE 8 is a detail view corresponding with FIG. 6 but showing a modification, and FIGURE 9 is a load-deflection characteristic.

Referring first to FIGS. 1 to 3 of the drawings, the axle box is indicated generally at 10.

The suspension connects the box 10 with the "horn guides" of a bogie a sole-bar of which is indicated at 12. The horn guides, which are indicated at 13, constitute spaced, confronting frame members of the bogie and the axle box is positioned therebetween.

The suspension comprises inextensible links 14 extending from opposite sides of the axle box 10 one to each of the horn guides 13. Rubber pivot members, which in the present example are formed each by a rubber bush 15, connect the outer ends of the links to the respective horn guides, and the inner ends of the links are connected to the axle box by rubber pivot members which again, in the present example are formed by rubber bushes 16.

Each bush 15, 16 has pins 17, 18 fixed in the bush, the bushes having inner metal sleeves 19, and the pins being received in the sleeves and keyed thereto as at 20.

Each pin 17, 18 is formed with a pressure arm, each of which constitutes a foot 21, 22 having a flat vertically extending abutment surface 23, 24.

The surfaces 23 abut flat vertically extending surfaces 25 on the horn guides 13, and the surfaces 24 abut flat vertically extending surfaces 26 on the axle box 10.

Each foot 22 has a hook part 28 which overlies an upwardly facing ledge 29 on the axle box 10, and each foot 21 has a hook part 30 which underlies a downwardly facing ledge 31 (see FIG. 1) formed on a part 32 attached to the sole-bar 12 of the bogie.

The hook parts and the ledges have flat abutting surfaces 33 which are downwardly inclined in the direction towards the axle-box, as shown in FIG. 1, the abutting surfaces 33 being generally parallel with the axes of the rubber bushes 15, 16 and those associated with each link 14 lying immediately adjacent the transverse plane containing the long axis of the link. Thus, as may be seen from FIG. 1, the surfaces 33 at the outer end of each link lie near to and above the transverse plane containing the long axis of the link, and the surfaces 33 at the inner end of each link lie near to and below the transverse plane containing the long axis of the link.

The horn guides 13 are formed each by a pair of members 41, the members 41 being fixed to the depending arms 42 of a U-shaped stirrup 43 which passes over the axle-box 10 and forms part of the bogie frame.

The parts 32 at each horn guide are formed by vertically disposed L-section arms which partially embrace the members 41 as shown in FIG. 2. The parts 32 are braced together by transverse members 44, and at their upper end by a transverse member 45 (see FIG. 3) which passes through a window 46 in the sole-bar 12. The member 45 has a boss 47 midway along its length in which is threaded a stud 48 having an enlarged head 49. The sole-bar carries load applying plates 50 one of which rests on the head of each of the studs 48.

By rotating the studs 48, the vertical position of the ledges 32 may be adjusted relative to the sole-bar and the horn guides 13. The vertical position of the ledges 32 determines the vertical position of the axle-box relative to the sole-bar because the abutting surfaces 23, 25 are able to slide on one another.

The height of the bogie frame above the rail level may therefore be adjusted by means of the studs 48 to allow for changes in the diameter of the wheels, e.g. when the wheels are re-turned to restore the tread and flange profile.

When the studs 48 are adjusted the arms 32 are guided so as to move vertically by the members 41 upon which they slide, the arms 32 being held against the members 41 under the action of the vertical load.

The rubber bushes 15, 16 are preferably bonded to the inner sleeves 19 and also to the links at their outer periphery. The bushes may be in radial pre-compression, the inner sleeves 19 for example having been expanded so to compress the bushes.

A stirrup member 51 connected with the axle box 10 by rods 57 passing through the bottom flange of the sole-bar 12 retains the axle box on the bogie when the bogie is removed from the track.

In the drawings the links 14 are shown to be horizontal. It is arranged that they should take up this position under tare load. It is further arranged that the links be in compression when in their horizontal position and that the links remain in compression even under overload.

The vertical load on the axle-box is resisted by the bushes 15, 16 acting in torsion, the bushes being loaded torsionally through the pins 17, 18.

The compression of the links gives rise to a negative stiffness effect which reduces the stiffness which would result from the torsion of the bushes alone. Thus, while the torsional stiffness of the bushes remains constant, the total vertical stiffness of the suspension is reduced.

By adjusting the amount of compression in the links under tare and load it is possible to obtain the required spring rate over the range of loading from tare to overload as used on most railway axle-boxes with much shorter links than would be the case if the links were not subject to compression by the vertical load.

The overall length of the suspension therefore may more closely approximate to that for a conventional installation having horn guides with an axle-box mounted therebetween.

Since the links 14 are always maintained in compression under load there is no tendency for the surfaces 23, 25, 24, 26 to lose contact and the compression alone may be used to hold the links between the axle-box 10 and the horn guides 13. In this connection, however, it is pointed out that the resultant load applied between the surfaces 23, 25, and 24, 26 due to the torque in the bushes and the compression of the links passes through a point well within the height of the surfaces.

The hook parts 28 and 30 and the co-operating ledges 29 and 31 are provided as a precaution only. The torsion in the bushes, under load, urge the hook parts against the ledges, which by co-operation add an extra horizontal load to the links which, due to the disposition of the hook parts and ledges is applied substantially in line with the long axis of the links.

With the construction described, there is no positive connection between the suspension and the bogie, and to assemble the suspension the bogie need only be dropped on to the assembled wheel sets, axle-boxes and links, these having been properly positioned on the track.

Although the torsional stiffness of the bushes and the negative stiffness due in part to the radial compression of the bushes act against one another, the damping factors associated with these two forms of deformation of the rubber are added. In view of this, shock absorbers may prove unnecessary.

With the suspension described the maximum vertical deflection under normal loading is greater than with known equivalent suspensions employing rubber springs while the relative stiffness in the vertical, transverse and longitudinal directions may be varied within wide limits and more especially, as compared with certain known rubber-spring suspensions, the ratio of the longitudinal stiffness to the vertical stiffness may be considerably increased, which is considered an advantage with higher train speeds, e.g. exceeding 80 m.p.h. At the same time, the ratio of the transverse to the vertical stiffness may be somewhat lowered (compared with said known suspensions) with benefit to the riding qualities of the train, the cost and weight of the suspension are relatively low.

In the example described the bushes 15, 16 constitute the sole springs of the axle suspension.

Alternatively, however, the links 14 may be provided, for locating and guiding the axle-box, in addition to a conventional or main spring system for transmitting a part of the vertical load to the axle-box, the links modifying the stiffness characteristic of the main spring system.

Instead of the bushes 14, rubber pivot members in the form of part-cylindrical or part-spherical rubber interlayers between correspondingly shaped attachment elements might be used.

FIGS. 4 and 5 illustrate a suspension according to the invention for the rear axle of a road vehicle. At 60 is shown part of a main side frame member of the vehicle chassis and 61 indicates the axle casing, one rear road wheel being indicated at 62.

The chassis further comprises a pair of transverse tubular frame members 63, 64. Between the frame members 63, 64 and equally spaced one on each side of the axle casing are a pair of transversely, inwardly directed pins 65, 66 which are mounted on the side frame member 60. The inner ends of the pins are supported by brackets 67, 68 carried respectively from the transverse frame members 63, 64.

The axle casing 61 carries an upwardly directed fork 69 in which is pinned, by means of a rubber bush 70, the lower end of an upstanding link 71 formed by two generally channel-section parts 72, 73 bolted back to back with the interposition of packing pieces 74, the purpose of which is hereinafter explained. The parts 72, 73 are formed with oppositely directed ears or trunnions for pivot pins 75, 76.

A pair of inextensible link structures 77, 78 extend from opposite sides of the axle casing 61. These link structures are constructed as shown in FIGS. 6 and 7, which illustrate one of the link structures, it being understood that the two link structures 77, 78 are identical. Each link structure 77, 78 comprises rubber pivot members in the form of rubber bush assemblies 80, 81 one at each end, the bush assemblies being connected together by rigid T-section arms 83, 84 cross braced between the bush assemblies by straps 85 welded to the stems or webs of the T-section arms.

The left hand, i.e. the larger diameter bush assembly 80 in FIG. 6 comprises an outer metal sleeve 86 formed with a pair of radially outwardly directed flanges 87 spaced apart axially of the sleeve 86. The flanges 87 are formed with diametrically opposed pairs of upstanding ears between which are bolted the corresponding ends of the arms 83, 84.

The sleeve 86 encloses a rubber bush 89 having an inner concentric metal sleeve 90 enclosing a further rubber bush 91 having inner and outer metal sleeves 92 and 93.

The right hand, i.e. the smaller diameter bush assembly 81 in FIG. 6, comprises a rubber bush 94 having inner and outer metal sleeves 95 and 96, the assembly of bush 94 and sleeves 95 and 96 being housed in a sleeve 97 welded to the other ends of the arms 83, 84.

The rubber bushes 89, 91 and 94 are preferably bonded to their inner and outer metal sleeves and may be held in radial pre-compression by their inner sleeves, the pre-compression being affected by radial expansion of the inner sleeves during assembly.

The sleeve 93 is locked with the sleeve 90 and the sleeve 96 is locked with the sleeve 97 for example by one or more keys 98, 99.

The link structures 77, 78 connect at their smaller diameter ends with the pins 76 and at their larger diameter ends with the pins 66, the pins being fixed as by keys in the inner sleeves 95 and 92.

The suspension being described further comprises a conventional leaf spring 100 (see FIG. 5) supporting the axle casing from the chassis in any known or convenient manner.

The rubber bushes 89, 91, 94 constitute auxiliary springs of the axle suspension and modify the load deflection characteristic of the leaf spring in a manner which will now be described.

In FIG. 4 the link structures 77, 78 are shown in their full bump load position, and at tare load they take up the horizontally in-line position shown in chain dotted lines in FIG. 4.

At a position intermediate these two angular positions it is arranged that there are no longitudinal forces acting in the link structures and no torsion in the rubber bushes. This position corresponds with a predetermined intermediate loading condition between tare and full bump load.

It follows from this that in the tare load position the torsion in the rubber bushes 89, 91 and 94 provides a torsional reaction which opposes the leaf spring and the radial compression in the bushes lengthwise of the links due to the foreshortened distance between the axes of the pins 76 and 66 and, therefore, the compression in the links, provides a negative stiffness both of which progressively diminish from tare to the intermediate loading condition referred to above. For continued deflection of the link structures under load increasing above the intermediate loading condition the vertical load on the axle casing is resisted by the bushes in torsion and by radial compression lengthwise of the links due to the now lengthening distance between the axes of the pins 76 and 66. Between tare and the intermediate loading condition, therefore, the overall stiffness of the suspension (including the leaf spring) is reduced compared with the leaf spring acting alone, and above the intermediate loading condition the overall stiffness of the suspension is increased compared with the leaf spring acting alone.

There is achieved, therefore, a suspension which is relatively soft under light loading conditions and which stiffens up for heavier loads.

This effect is shown more clearly in FIG. 9, which is a load deflection characteristic typical of that which may be obtained with a road vehicle axle suspension as just described.

In FIG. 9 curve $a$ represents the load deflection characteristic of the leaf spring acting alone, and curve $b$ represents the overall characteristic of the suspension.

In this particular example the tare load is 1500 lbs. and the intermediate load referred to above, in the region of 4900 lbs. as represented by the intersection of the curves $a$ and $b$.

The suspension as described makes possible the use of a softer leaf spring than would normally be required to limit the maximum deflection to within the particular design requirements. Thus, a leaf spring acting alone and giving the same maximum deflection, under the designed full bump load, would need to have a load-deflection characteristic as indicated by curve $c$.

By varying the thickness of the packing pieces 74, the negative stiffness at tare due to the compression in the link structures 77, 78 may be varied and the effect of tolerances obviated.

At the intermediate position of the link structures 77, 78 the rubber bushes may be in torsion so that at tare the vertical loads on the axle casing will in part be supported by torsion in the bushes.

By having an intermediate position in which there are no longitudinal forces in the link structures and no torsion in the bushes however the installation of the link structures is facilitated since they may be installed at the deflection representing the intermediate loading condition.

The double concentric bush assembles 80 give rise to particular advantages in arriving at a desired overall characteristic for the suspension. When the overall stiffness of the link structures 77, 78 is required to be negative under certain loading conditions, as has been described, difficulty may be experienced in making the negative stiffness due to the compression in the links sufficiently greater than the positive stiffness due to the torsion in the bushes to obtain an overall negative stiffness for the link structures.

To obtain a low torsion rate the bush 91 of small inside diameter is used, and to obtain the required radial load capacity to withstand the compression in the links the outside diameter of this bush is also kept small so that the thickness of the rubber is small.

The outer diameter of the inner sleeve 90 of the outer bush 89 is such that a larger radial deflection of the bush assembly can be achieved without overloading. The effect is therefore that the bush 91 provides most of the torsional flexibility while the bush 89 provides most of the radial flexibility.

The link structures as described, employing the large diameter bush assemblies 80 at their outer ends and the small diameter bush assemblies 81 at their inner ends is preferred because it makes the best use of the space available. In the fully laden position of the link structures, as shown in full line in FIG. 4 the axes of the bush assemblies 81 is considerably higher than the axes of the bush assemblies 80 so there is less room for the bush assemblies at the inner ends of the link structures under a given floor line.

It has been stated that the suspension as described makes possible the use of a softer leaf spring than would normally be required (compare curves $a$ and $c$ FIG. 9)

assuming that the leaf spring would be acting alone. This is not to be regarded as an advantage offered by the suspension as described since an equivalent suspension using a leaf spring in conjunction with an overload buffer or spring aid would probably not employ a stiffer spring. The particular advantage of the suspension as described lies in that it gives a low stiffness rate at tare load with a leaf spring which is nevertheless stiff enough and strong enough to locate the axle properly and take horizontal loading and if necessary torque reaction.

To reduce the increase of stiffness beyond the intermediate loading condition afforded by the suspension as described the bush assemblies 80 of the link structures 77 and 78 may be replaced by bush assemblies having an outer elliptical rubber bush 104 as shown in FIG. 8. The bushes 104 have their major axes extending along the axes of the respective link structures and allow increased deflections in the directions of these axes to achieve the required effect.

The bushes 104 are elliptical in the sense that only their outer sleeves are elliptical in distinction to the normal so called elliptical bush having both inner and outer sleeves elliptical. The bushes 104 have outer elliptical sleeves and inner cylindrical sleeves, the assemblies further comprising inner cylindrical bushes for the purpose hereinbefore explained for the bush assemblies 80.

The increased deflection allowed by the elliptical bushes 104 is due to the increased radial thickness of rubber along the link as compared with the radial rubber thickness transverse to the link. The same effect may be obtained if desired by making the outer rubber bush cylindrical and the inner rubber bush elliptical with its major axes disposed transverse to the link. This tends to a heavier and more expensive construction however.

An assembly of concentric bushes as described with reference to FIGS. 6 and 7 of FIG. 8 may be employed in the axle box suspension described with reference to FIGS. 1 to 3 if desired.

With the road vehicle suspension as with the axle box suspension, the damping factors associated with the rubber deformation in torsion and compression are additive, and shock absorbers are probably unnecessary, a high level of damping being inherent in the suspension as described.

The word "rubber" as used in this specification is intended to include material having the properties of rubber.

What is claimed is:

1. A vehicle axle suspension having a maximum stiffness under a designed full bump load condition and a minimum stiffness under a designed tare load condition, the suspension comprising, in combination, a main leaf spring system and an auxiliary spring system, the main leaf spring system having a substantially constant stiffness throughout the deflection range of the axle which substantially constant stiffness is greater than said minimum stiffness, the main leaf spring system supporting the axle casing from a frame of the vehicle, and the auxiliary spring system likewise supporting the axle casing from said frame but having a variable stiffness throughout the deflection range of the axle which, under said tare load condition, is negative so as to reduce the overall stiffness of the suspension to said minimum value, the auxiliary spring system comprising a pair of links extending one on each side of the axle casing generally fore-and-aft of the vehicle, a pivot member at the inner end of each link connecting the link to the axle casing, and a pivot member at the outer end of each link connecting the link to said frame, one at least of said pivot members associated with each link being of rubber and providing, up to a predetermined loading condition greater than tare load, a torsional reaction acting to load the main leaf spring system, said links being disposed horizontally in line under said tare load condition and each being of a length such that, under said tare load condition, when they are horizontally in line, each link is held in lengthwise compression between the axle casing and said frame, whereby the rubber pivot members are compressed lengthwise of the links, and at said full bump load condition the links are in tension, vertical loads on the axle casing above said predetermined load being resisted by the rubber pivot members acting in torsion and by compression thereof lengthwise of the links.

2. A vehicle axle suspension having a maximum stiffness under a designed full bump load condition and a minimum stiffness under a designed tare load condition, the suspension comprising, in combination, a main leaf spring system and an auxiliary spring system, the main leaf spring system having a substantially constant stiffness throughout the deflection range of the axle which substantially constant stiffness is greater than said minimum stiffness, the main leaf spring system supporting the axle casing from a frame of the vehicle, and the auxiliary spring system likewise supporting the axle casing from said frame but having a variable stiffness throughout the deflection range of the axle which under said tare load condition is negative so as to reduce the overall stiffness of the suspension to said minimum value, the auxiliary spring system comprising a pair of links extending one on each side of the axle casing generally fore-and-aft of the vehicle, an intermediate, upstanding link pinned to the axle casing, a pivot member at the inner end of each of said pair of links connecting the link to said intermediate link, and a pivot member at the outer end of each of said pair of links connecting the link to said frame, one at least of said pivot members associated with each of said pair of links being of rubber, said pair of links being disposed horizontally in line under said tare load condition and each being of a length such that under said tare load condition, when they are horizontally in line, said pair of links are held in lengthwise compression between the intermediate link and said frame, whereby the rubber pivot members are compressed lengthwise of said pair of links, and at said full bump load condition said pair of links are in tension, vertical loads on the axle casing above said predetermined load being resisted by the rubber pivot members acting in torsion and by compression thereof lengthwise of said pair of links.

3. A vehicle axle suspension having a maximum stiffness under a designed full bump load condition, and a minimum stiffness under a designed tare load condition, the suspension comprising, in combination, a main leaf spring system and an auxiliary spring system, the main leaf spring system having a substantially constant stiffness throughout the deflection range of the axle which substantially constant stiffness is greater than said minimum stiffness, the main leaf spring system supporting the axle casing from a frame of the vehicle, and the auxiliary spring system likewise supporting the axle casing from said frame but having a variable stiffness throughout the deflection range of the axle which under said tare load condition is negative so as to reduce the overall stiffness of the suspension to said minimum value, the auxiliary spring system comprising a pair of links extending one on each side of the axle casing generally fore-and-aft of the vehicle, a pivot member at the inner end of each link connecting the link to the axle casing and a pivot member at the outer end of each link connecting the link to said frame, both pivot members associated with each link being rubber and one at least of the rubber pivot members associated with each link comprising concentric rubber bushes each having inner and outer metal sleeves, said links being disposed horizontally in line under said tare load condition and each being of a length such that under said tare load condition, when they are horizontally in line, the links are held in lengthwise compression between the axle casing and said frame.

4. A vehicle axle suspension as claimed in claim 1, wherein said upstanding link is formed in two parts which are removably attached together with interposed packing to increase the compression in each of said pair of links under tare load.

5. A vehicle axle suspension as claimed in claim 3, wherein the concentric rubber bushes are cylindrical, having cylindrical inner and outer metal sleeves.

6. A vehicle axle suspension as claimed in claim 3, wherein the inner one of the concentric rubber bushes is cylindrical and the outer one of the concentric rubber bushes has an elliptical outer sleeve and a cylindrical inner sleeve, the elliptical outer sleeve having its major axis disposed along the axis of the link.

References Cited in the file of this patent

UNITED STATES PATENTS

| | | |
|---|---|---|
| 2,255,820 | Schieferstein | Sept. 16, 1941 |
| 2,270,572 | Woolson et al. | Jan. 20, 1942 |
| 2,467,721 | Avila | Apr. 19, 1949 |
| 2,509,769 | Hirst | May 30, 1950 |
| 2,715,022 | Krotz | Aug. 9, 1955 |

FOREIGN PATENTS

| | | |
|---|---|---|
| 862,692 | Germany | July 8, 1949 |
| 665,282 | Great Britain | Jan. 23, 1952 |
| 749,031 | Great Britain | May 16, 1956 |